United States Patent
Bondesan et al.

(10) Patent No.: US 11,836,572 B2
(45) Date of Patent: Dec. 5, 2023

(54) QUANTUM INSPIRED CONVOLUTIONAL KERNELS FOR CONVOLUTIONAL NEURAL NETWORKS

(71) Applicant: QUALCOMM Incorporated, San Diego, CA (US)

(72) Inventors: Roberto Bondesan, Amsterdam (NL); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 17/031,501

(22) Filed: Sep. 24, 2020

(65) Prior Publication Data
US 2021/0089955 A1 Mar. 25, 2021

Related U.S. Application Data

(60) Provisional application No. 62/905,368, filed on Sep. 24, 2019.

(51) Int. Cl.
| | |
|---|---|
| *G06N 10/00* | (2022.01) |
| *G06N 3/04* | (2023.01) |
| *G06F 17/16* | (2006.01) |
| *G06N 5/04* | (2023.01) |
| *G06N 3/063* | (2023.01) |
| *G06N 7/01* | (2023.01) |

(52) U.S. Cl.
CPC ............. *G06N 10/00* (2019.01); *G06F 17/16* (2013.01); *G06N 3/04* (2013.01); *G06N 3/063* (2013.01); *G06N 5/04* (2013.01); *G06N 7/01* (2023.01)

(58) Field of Classification Search
None
See application file for complete search history.

(56) References Cited

PUBLICATIONS

Cong et al., Quantum Convolutional Neural Networks, arXiv:1810.03787v2 [quant-ph] May 2, 2019, pp. 1-12 (Year: 2019).*
Gao et al., An efficient quantum algorithm for generative machine learning, arXiv:1711.02038v1 [quant-ph] Nov. 6, 2017, pp. 1-22 (Year: 2017).*

* cited by examiner

*Primary Examiner* — Alan Chen
(74) *Attorney, Agent, or Firm* — Patterson & Sheridan LLP

(57) ABSTRACT

Certain aspects of the present disclosure provide a method for performing quantum convolution, including: receiving input data at a neural network model, wherein the neural network model comprises at least one quantum convolutional layer; performing quantum convolution on the input data using the at least one quantum convolutional layer; generating an output wave function based on the quantum convolution using the at least one quantum convolution layer; generating a marginal probability distribution based on the output wave function; and generating an inference based on the marginal probability distribution.

21 Claims, 10 Drawing Sheets

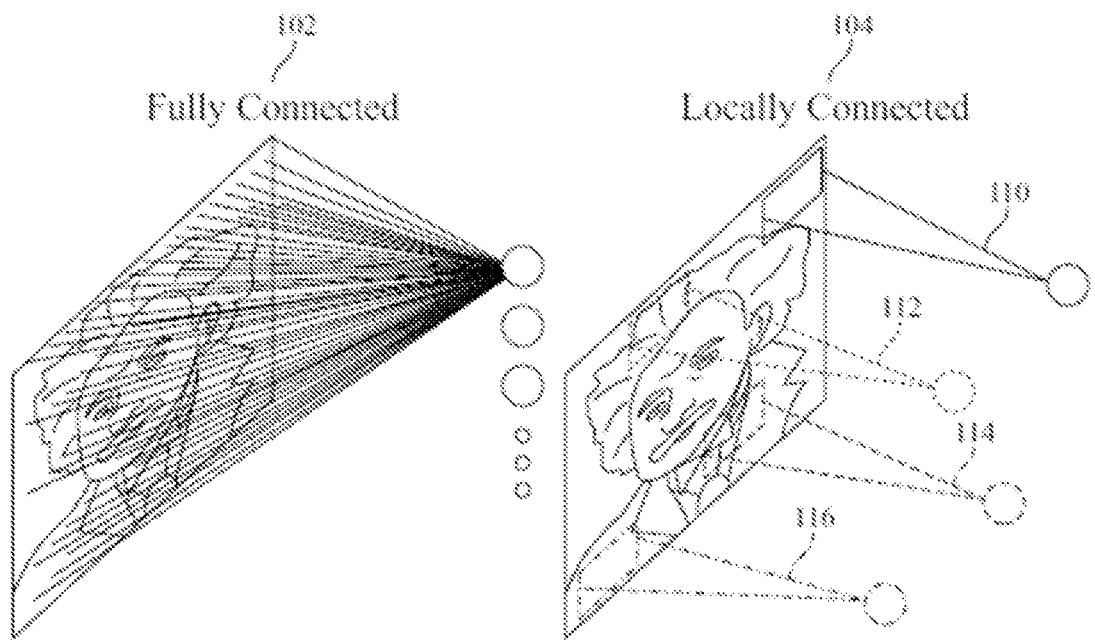
FIG. 1A
(PRIOR ART)
FIG. 1B
(PRIOR ART)
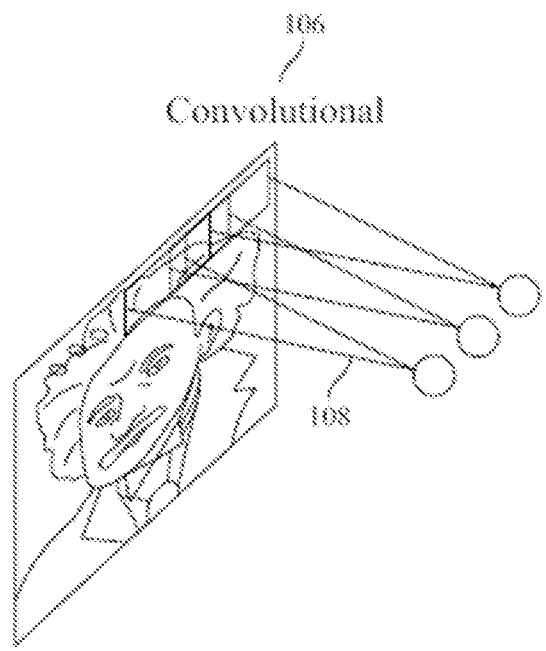
FIG. 1C
(PRIOR ART)

QUANTUM INSPIRED CONVOLUTIONAL KERNELS FOR CONVOLUTIONAL NEURAL NETWORKS

CROSS-REFERENCE TO RELATED APPLICATIONS

This application claims the benefit of U.S. Provisional Patent Application No. 62/905,368, filed on Sep. 24, 2019, the entire contents of which are incorporated herein by reference.

INTRODUCTION

Aspects of the present disclosure relate to machine learning, and in particular to quantum inspired convolutional kernels for quantum convolutional neural networks.

Generally, machine learning may produce a trained model, such as an artificial neural network, classification tree, and the like, which represents a generalized fit to a set of training data that is labeled. Applying the trained model to new data produces inferences, which may be used to gain insights regarding the new data. In some cases, applying the trained model to the new data is referred to as "running an inference" on the new data.

Both training and inferencing are computationally intensive, especially as model complexity increases. Accordingly, methods are needed for improving the performance of both machine learning and the resultant models.

BRIEF SUMMARY

Certain embodiments provide a method for performing quantum convolution, including: receiving input data at a neural network model, wherein the neural network model comprises at least one quantum convolutional layer; performing quantum convolution on the input data using the at least one quantum convolutional layer; generating an output wave function based on the quantum convolution using the at least one quantum convolution layer; generating a marginal probability distribution based on the output wave function; and generating an inference based on the marginal probability distribution.

Further embodiments provide a processing system, comprising: a memory comprising computer-executable instructions; a processor configured to execute the computer-executable instructions and cause the processing system to: receive input data at a neural network model, wherein the neural network model comprises at least one quantum convolutional layer; perform quantum convolution on the input data using the at least one quantum convolutional layer; generate an output wave function based on the quantum convolution using the at least one quantum convolution layer; generate a marginal probability distribution based on the output wave function; and generate an inference based on the marginal probability distribution.

Further embodiments provide a non-transitory computer-readable medium comprising computer-executable instructions that, when executed by a processor of a processing system, cause the processing system to perform a method for performing quantum convolution, the method comprising: receiving input data at a neural network model, wherein the neural network model comprises at least one quantum convolutional layer; performing quantum convolution on the input data using the at least one quantum convolutional layer; generating an output wave function based on the quantum convolution using the at least one quantum convolution layer; generating a marginal probability distribution based on the output wave function; and generating an inference based on the marginal probability distribution.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 1A-1D depict examples of various types of neural networks.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1D:
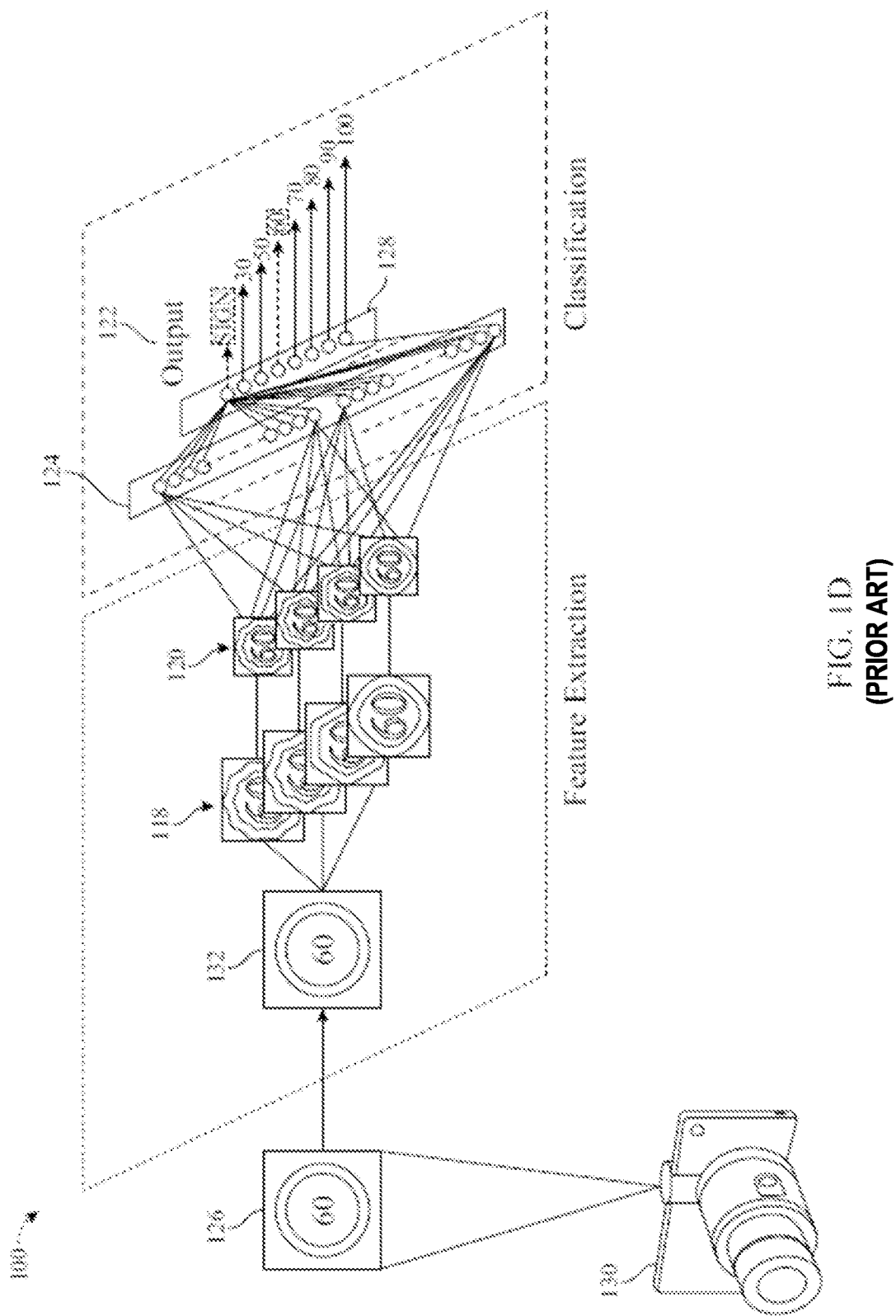

Aspects of the present disclosure provide apparatuses, methods, processing systems, and computer readable mediums for performing machine learning using quantum inspired convolutional kernels.

Quantum convolutional kernels may be used as building blocks for conventional neural networks with quantized activations. Thus, the quantum inspired neural networks described herein can be configured for myriad use cases, including conventional machine learning domains, such as image or sound classification. However, the quantum nature of the convolutional kernels described herein increases the flexibility and representative power of the quantum inspired neural networks as compared to conventional neural networks.

Brief Introduction to Deep Learning and Deep Neural Networks

Prior to the advent of deep learning, a machine learning approach for a task may have relied heavily on human engineered features, perhaps in combination with a shallow classifier. For example, the human engineered features may include templates or kernels tailored to a specific problem domain by engineers with domain expertise, and the shallow classifier may include a two-class linear classifier in which a weighted sum of input values are compared with a threshold to predict to which class the input belongs.

Deep learning architectures, such as deep neural networks, in contrast, may learn to represent features that are similar to what a human engineer might design, but through training. Generally, deep learning architectures learn to represent inputs at successively higher levels of abstraction in each layer, thereby building up a useful feature representation of the input data. Thus, a deep learning architecture may learn to represent and recognize new types of features that a human might not have even considered.

For example, when presented with image input data, the first layer of a deep neural network may learn to recognize relatively simple features, such as edges, in the input data stream. In another example, if presented with auditory input data, the first layer of a deep neural network may learn to recognize spectral powers in specific frequencies. Then, a second layer of the deep neural network takes the output of the first layer as input, and may learn to recognize combinations of features, such as simple shapes for image data or combinations of sounds for auditory data. A further higher layer of the deep neural network may learn to represent complex shapes in image data or words in auditory data, and a higher layer yet may learn to recognize common visual objects or spoken phrases.

Deep learning architectures may thus perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Deep learning architectures may be designed with a variety of connectivity patterns between layers. Generally, the connections between layers of a neural network may be fully connected or locally connected. Fully connected layers have connections between each input node (e.g., an artificial neuron) and each output node, while locally connected do not.

Further, in feed-forward neural networks, information is passed from lower to higher layers, with each node in a given layer communicating to nodes in higher layers. In recurrent or feedback networks, connections are made between nodes in the same layer. Recurrent connections may be helpful in recognizing patterns that span more than one of the input data chunks that are delivered to the neural network in a sequence. In feedback networks, connections are made from nodes in a higher layer to nodes in a lower layer. A network with many feedback connections may be helpful when the recognition of a high-level concept aids in discriminating the particular low-level features of an input.

FIG. 1A illustrates an example of a fully connected neural network 102. In a fully connected neural network 102, a neuron in a first layer may communicate its output to every neuron in a second layer, so that each neuron in the second layer will receive input from every neuron in the first layer.

FIG. 1B illustrates an example of a locally connected neural network 104. In a locally connected neural network 104, a neuron in a first layer may be connected to a limited number of neurons in the second layer. More generally, a locally connected layer of the locally connected neural network 104 may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

One example of a locally connected neural network is a convolutional neural network. FIG. 1C illustrates an example of a convolutional neural network 106. The convolutional neural network 106 may be configured such that the connection strengths associated with the inputs for each neuron in the second layer are shared (e.g., 108). Convolutional neural networks may be well suited to problems in which the spatial location of inputs is meaningful.

The processing of each layer of a convolutional neural network may be considered a spatially invariant template or basis projection. If the input is first decomposed into multiple channels, such as the red, green, and blue channels of a color image, then the convolutional neural network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linear operation, such as a rectification, max(0, x), ReLU, or the like. Values from adjacent neurons may be further pooled, which corresponds to down sampling, and may provide additional local invariance and dimensionality reduction.

One type of convolutional neural network is a deep convolutional network (DCN). Deep convolutional networks (DCNs) generally include convolutional layers as well as additional pooling and normalization layers. DCNs can be trained using supervised learning in which both the input and output targets are known for many exemplars, which are used to modify the weights of the network by use of network optimization techniques, such as gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

FIG. 1D illustrates a detailed example of a DCN 100 designed to recognize visual features from an image 126 input from an image capturing device 130, such as a car-mounted camera. The DCN 100 of the current example may be trained to identify traffic signs and a number provided on the traffic sign. Of course, the DCN 100 may be trained for other tasks, such as identifying lane markings or identifying traffic lights. These are just some example tasks, and many others are possible.

DCN 100 may be trained with supervised learning. During training, the DCN 100 may be presented with an image, such as the image 126 of a speed limit sign, and a forward pass may then be computed to produce an output 122.

In this example, DCN 100 includes a feature extraction section and a classification section. Upon receiving the image 126, a convolutional layer 132 applies convolutional kernels (not shown) to the image 126 to generate a first set of feature maps 118. In some examples, a kernel comprises a two-dimensional array of weights designed to emphasize different aspects of an input data channel, and a filter comprises a three-dimensional structure comprising multiple kernels stacked together. However, in other examples, "kernel" and "filter" may be used interchangeably to refer to sets of weights applied in a convolutional neural network. Three-dimensional filters are frequently used in deep learning.

In one example, the convolutional kernel for the convolutional layer 132 may be a 5×5 kernel that generates 28×28 feature maps. Further in the present example, because four different feature maps are generated in the first set of feature maps 118, four different convolutional kernels are applied to the image 126 at the convolutional layer 132.

The first set of feature maps 118 may be subsampled by a max pooling layer (not shown) to generate a second set of feature maps 120. The max pooling layer reduces the size of the first set of feature maps 118. That is, a size of the second set of feature maps 120, such as 14×14, is less than the size of the first set of feature maps 118, such as 28×28. The reduced size provides similar information to a subsequent layer while beneficially reducing memory consumption and computational complexity. The second set of feature maps 120 may be further convolved via one or more subsequent convolutional layers (not shown) to generate one or more subsequent sets of feature maps (not shown).

In the example of FIG. 1D, the second set of feature maps 120 is provided to a fully-connected layer 124, which in turn generates an output feature vector 128. Each feature of the output feature vector 128 may include a number that corresponds to a possible feature of the image 126, such as "sign," "60," and "100." In some cases, a softmax function (not shown) may convert the numbers in the output feature vector 128 to a probability. In such cases, an output 122 of the DCN 100 is a probability of the image 126 including one or more features.

In the present example, the probabilities in the output 122 for "sign" and "60" are higher than the probabilities of the others of the output 122, such as "30," "40," "50," "70," "80," "90," and "100".

Before training DCN 100, the output 122 produced by DCN 100 is likely to be incorrect. Thus, an error may be calculated between the output 122 and a target output. The target output is the ground truth of the image 126 (e.g., "sign" and "60"). The weights of DCN 100 may then be adjusted so the output 122 of DCN 100 is more closely aligned with the target output.

To adjust the weights of DCN 100, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, DCN 100 may be presented with new images and a forward pass through the network may yield an output 122 that may be considered an inference or a prediction of the DCN.

Convolution in Convolutional Neural Networks

Convolution is used in deep learning architectures to extract useful features from input data. For example, in a convolutional neural networks, convolution enables the extraction of different features using kernels or filters whose weights are automatically learned during training. The extracted features are then combined to make inferences.

In some embodiments, convolutional layers in a convolutional neural network are factorized using a separable depthwise convolution into two components: spatial fusion, where each spatial channel is convolved independently by a depthwise convolution; and channel fusion, where all the spatial channels are linearly combined by 1×1-convolutions, known as pointwise convolutions.

During spatial fusion, the network learns features from the spatial planes and during channel fusion the network learns relations between these features across channels. This is sometimes implemented using 3×3 filters for the spatial fusion, and 1×1 filters for the channel fusion. Generally, channel fusion via pointwise convolution is useful for dimensionality reduction for efficient computations, efficient low dimensional embedding or feature pooling, and for applying nonlinearity again after convolution, to name a few things.

Brief Introduction to Quantum Concepts for Quantum Inspired Convolution

Quantum mechanics is currently the most accurate description for physical phenomena at a very small scale, such as the behavior of molecules, atoms, and subatomic particles. In quantum mechanics, the state of a system at a given time may be described by a complex wave function, which may also be referred to as state vector in a complex vector space. In particular, states in quantum mechanics may be represented as abstract vectors in a Hilbert space H and denoted as $|\psi\rangle$, where a Hilbert space is an abstract vector space possessing the structure of an inner product that allows length and angle to be measured.

In various examples described herein, quantum bits (or "qubits") have two possible z-basis states, $|0\rangle$ and $|1\rangle$. These states may generally be defined relative to a particular frame of reference, such as spin values measured along a z-axis. A pure qubit state is a coherent superposition of the basis states. This means that a single qubit can be described by a linear combination of $|0\rangle$ and $|1\rangle$. More generally, a qubit may be described as a complex linear combination (or superposition) of up and down z-spins: $|\psi\rangle = \alpha|0\rangle + \beta|1\rangle$ where alpha and beta are probability amplitudes, which may be expressed as general and complex numbers.

Generally, N disentangled qubits may be described as a product state: $|\psi\rangle = \Pi_{i=1}^{N}|\psi_i\rangle$. Qubits entangle with each other when interacting (known as decoherence), and the resulting wave function becomes a complex linear combination of an exponential number of $2^N$ terms. This can be written as $|\psi'\rangle = U|\psi\rangle$, where U is a unitary matrix in a $2^N \times 2^N$ dimensional space. This entangled state is still "pure" in the sense that there is nothing more to learn about it, i.e., its entropy is zero and it represents maximal information about the system. However, in quantum mechanics that does not mean knowledge of the system is complete.

Time evolution in quantum mechanics may be described by a unitary transformation, such as: $|\psi(t)\rangle = U(t, 0)|\psi(0)\rangle$ with $U(t, 0) = e^{iHt}$, where H is the Hamiltonian, a Hermitian operator. Time evolution entangles qubits, and can be used to map an input state to an output state as a layer in a neural network. To incorporate symmetry into this map, such as translational symmetry, this unitary transformation can be required to have a special structure consistent with the commutator relation $[H, T] = HT - TH = 0$. Note that this definition is consistent with the definition of equivariance, namely: first evolving and then transforming, $TU(t, 0)|\psi\rangle$, should be the same as first transforming and then evolving, $U(t, 0)T|\psi\rangle$.

Measurements in quantum mechanics may be accomplished by projecting a state onto the eigenbasis of a symmetric positive definite operator A. The quantum system collapses into a particular state with a probability given by Born's rule, namely: $p_i=|\langle\phi_i|\psi\rangle|^2$ where $\{|\phi_i\rangle\}$ are the orthonormal eigenvectors of A. A special case of this is a deterministic projection onto the special state $|0\rangle$, which is also known as the "vacuum state".

A mixed state in quantum mechanics is a mixture of a number of pure quantum states. Probabilities in this mixture encode uncertainty about what quantum state the system is in. This is different from the uncertainty about the outcome of a quantum measurement of a pure state, which cannot be resolved by learning more about the system. Knowledge about a pure state is maximal but not complete, and knowledge about a mixed state is not even maximal.

Mixed states are not naturally described by wave vectors. For that, a density matrix $\rho$ may be used. For a pure state, a rank 1 matrix (or outer product) may be used, such as: $\rho=|\psi\rangle\langle\psi|$. But for a mixed state, the rank will be higher and $\rho$ can be decomposed as $\rho=|\Sigma_k p_k|\psi_k\rangle\langle\psi_k|$. Note that a unitary transformation will change the basis, but not the rank, and hence will keep pure states pure. Thus, Rank($\rho'$)=Rank($U\rho U^\dagger$). Further, time evolution will preserve rank and keep a pure state pure.

The probability of a measurement is given by the trace of the density matrix over the projector $A_i=|\phi_i\rangle\langle\phi_i|$, namely $p_i=\text{Tr}(A_i\varphi=\text{Tr}|\phi_i\rangle\langle\phi_i|\psi\rangle\langle\psi|=|\langle\phi_i|\psi\rangle|^2$ (i.e., Born's rule). This probability can, in case of a mixed density matrix, contain both quantum and classical uncertainties.

Finally, similar to marginalization in classical probability theory, degrees of freedom that are not of interest can be traced over, i.e., $\rho_a=\text{Tr}_b(\varphi)$. In a twist of quantum logic, when the full density matrix represents a pure entangled quantum system with zero entropy, the reduced density matrix represents a mixed state with non-zero entropy. Thus quantum uncertainty can become classical uncertainty by simply choosing to ignore part of the Hilbert space. Also, in this case $S_a \geq S_{a+b}$, which is not possible for classical entropy because the total Shannon entropy can never be lower than the entropy of any of its parts.

Quantum Inspired Convolutional Layers for a Convolutional Neural Network

Viewing quantum mechanics as another consistent statistical theory that happens to describe nature at small scales allows for using this theory to describe classical signals that are naturally described in Hilbert spaces. The quantum inspired neural networks described herein may run on classical inputs, such as images or sound, as well as for binary activations, which is beneficial because binary activations allow lower memory requirements during training and can further save network bandwidth in split distributed learning when exchanging activations.

The space of qubits for a quantum computation is dictated by the value and spatial structure of the input signal to a quantum convolutional neural network. A classical binary input describing bits arranged in a d dimensional array, $x \in \{0,1\}^{n_1} \times \ldots \times n_d$, gives rise to a grid of qubits of size $n_1 \times \ldots \times n_d$. In the simplest scenario, the input data is one dimensional, and the qubits form a chain so that the input can be embedded as the product state: $|x\rangle = \otimes_{i=1}^N [(1-x_i)|0\rangle + x_i|1\rangle]$, where $\{|0\rangle, |1\rangle\}$ is a basis of $\mathbb{C}^2$.

A quantum convolution C is defined as an operator on the chain with the natural properties of unitarity, translation invariance, and locality. In particular, if the input to the convolution is a translation invariant state, its output is translation invariant as well.

When acting for an infinitesimal time E, a quantum convolution C has the general form $C=1+i\epsilon\Sigma_{i=1}^N\Sigma_\alpha f_{\alpha_1\ldots\alpha_k}\sigma_i^{\alpha_1}\ldots\sigma_{i+k}^{\alpha_k}$, where k is the filter size, f is a real tensor of coefficients shared across the k adjacent qubits, and $\sigma_i^\alpha$, $\alpha=1, 2, 3$ is a local basis of non-trivial Hermitian operators at site i. In particular, if the input data to the convolution is a translation invariant state, its output is translation invariant as well.

Figure 2:
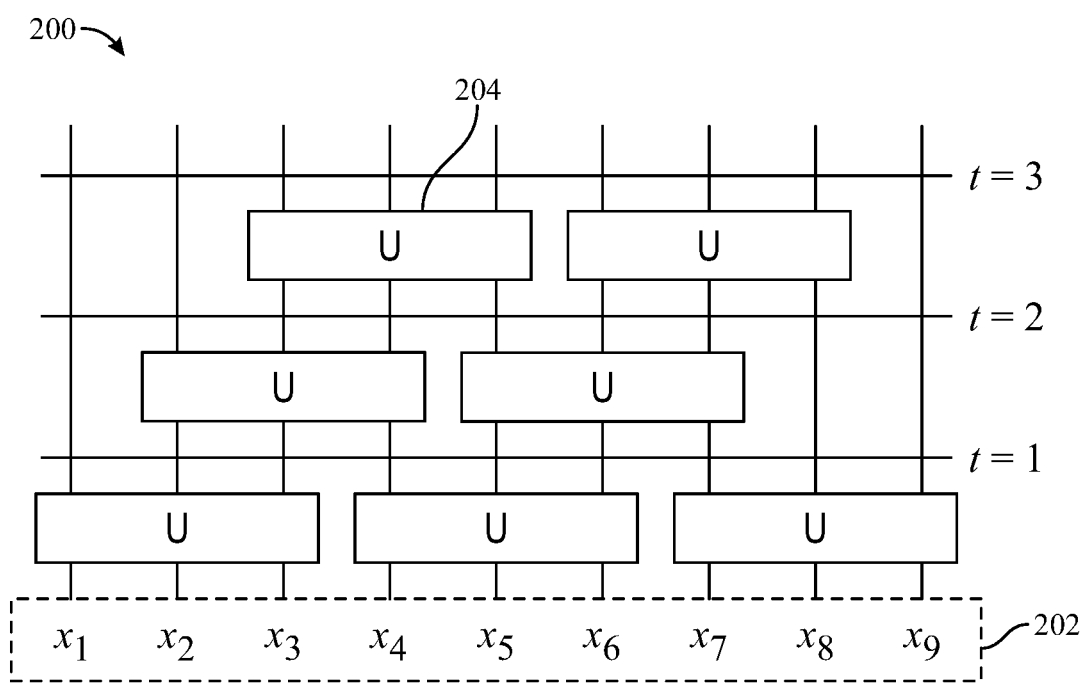
FIG. 2 depicts an example of a quantum circuit.

For finite time, a quantum convolution C may be defined as a quantum circuit. FIG. 2 depicts an example quantum circuit 200 for a quantum convolution with a filter size of 3 (as indicated by the three-qubit circuit U (204) spanning three input lines) acting on a one-dimensional signal 202 of length 9, whose states are associated to the vertical input lines ($x_1, \ldots, x_9$). Further in FIG. 2, the horizontal lines correspond to discrete time steps (t=1, 2, and 3). In this example, the three-qubit circuit U (204) is reused across the discreet time steps.

In the example depicted in FIG. 2, open boundary conditions are chosen, and sharing the value of the operator U ensures invariance in the bulk of the system by translations of step equal to the filter size. Note that in this example, the size of U is $2^k \times 2^k$, and here k=3. Thus, there are 64 trainable parameters in U, which can be learned during in the same manner as conventional convolutional filters. In other words, these trainable parameter act like a conventional filter or kernel that is trained during a convolution process.

The output of a computation C|x⟩ is an entangled state. This implies quantum correlations between far apart sites of the chain even though these are exponentially decaying. Classically, this translates to a non-factorized joint probability distribution, even if the inputs to the convolution were independent random variables.

The above construction has a straightforward generalization to the case of higher dimensional signals. For example, in the case of an image, which may be represented as a binary 3d tensor $x_{ijk}$ of shape H×W×C (height, width, channel) by binarizing it or by using its bitmap representation, the associated space of qubits has a three-dimensional grid structure. A general quantum convolution is then specified by giving three filter sizes, $k_1$, $k_2$, $k_3$ (one for each direction) and a unitary matrix U that acts on the qubits in a cube of the lattice of size $V=k_1 \times k_2 \times k_3$. The circuit corresponding to the quantum convolution is then obtained by considering V time steps. At the first time step, U is applied to a sub-lattice of the grid with cells of size V starting from a corner of the grid, and then at successive time steps, the sub-lattice is slid by one site in one of the three directions in a prescribed order. For example, in one spatial dimension and with a system of 9 qubits with periodic boundary conditions and V=3, the sub-lattice t=1 consists of inputs $\{x_1, x_4, x_7\}$, then at t=2 of $\{x_2, x_5, x_8\}$, and then at t=3 of $\{x_3, x_6, x_9\}$.

Figure 4:
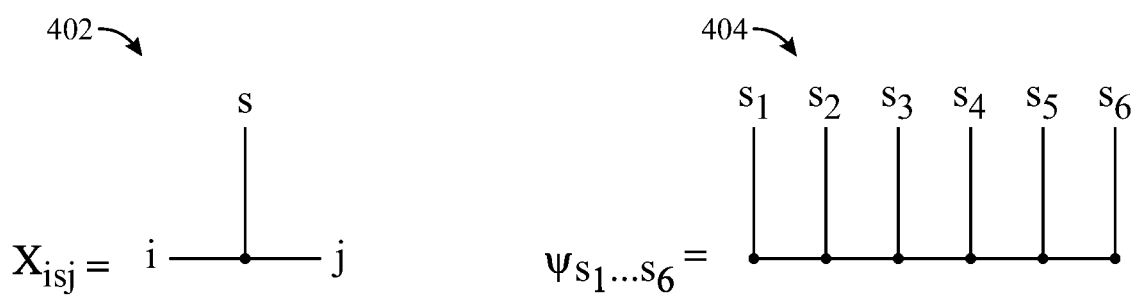
FIG. 4 depicts a graphical representation of matrix product states.
Figure 5:
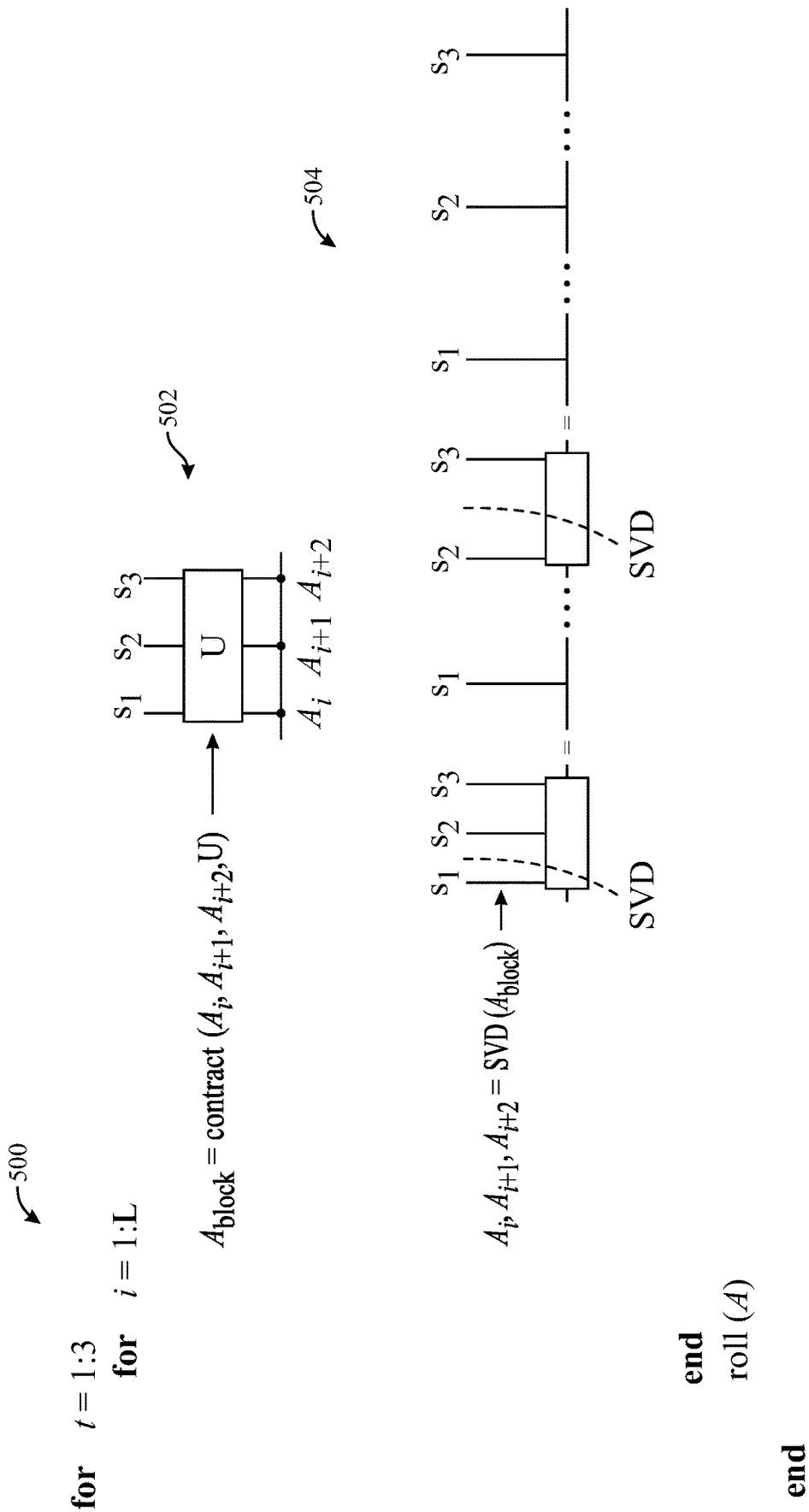
FIG. 5 depicts an example of sequential sampling for matrix product states.

Examples of quantum convolution are further described with respect to FIGS. 4 and 5.

Quantum Pooling Layers

To reduce the size of the computational space as the quantum computation progresses, a subset of qubits can be discarded. This is the quantum analog of pooling in conventional neural networks, and may be referred to as a quantum pooling operations. Mathematically, this can be achieved by a generalization of a unitary operator, which may be referred to as a quantum channel. One possibility is to trace the density matrix over the space H' of the qubits to be discarded. Another possibility is to perform a partial measurement, by projecting the qubits in H' onto a state selected at random according to their marginal probability distribution. Yet, another possibility is to select the state deterministically. In some examples described herein, projecting onto the vacuum state $|0\rangle$ each spin to be discarded may be considered.

Increasing Channels in a Quantum Convolutional Network

In conventional convolutional neural networks, while the spatial size is reduced by convolution, the channel dimensions are increased, which corresponds to "features" extracted by a convolutional layer. In the quantum convolutional network context, the same can be achieved using ancilla qubits prepared in a given state, such as the vacuum state $|0\rangle$. Generally, ancilla bits are bits whose values are known a priori. In this way, the representational power of the quantum neural network can be increased by applying a unitary matrix that entangles an input state with ancilla channel qubits. Note that the resulting feature map is an isometry, which preserves the norm of the incoming state.

Non-Linearities in Quantum Convolutional Networks

A fundamental characteristic of a conventional neural network is the presence of non-linearities, such as provided by non-linear activation operations throughout the network. Quantum mechanics, however, is linear in the qubits, which could potentially limit the representation capacity of a quantum neural network. However, this potential limitation is overcome when a quantum circuit, such as depicted in FIG. 2, implements an arbitrary Boolean function.

In fact, functions of discrete variables are polynomials. Thus, acting with an arbitrary unitary, U, on a state that describes the conventional input data $|x\rangle = \otimes_{i=1}^{n} [(1-x_i)|0\rangle + x_i|1\rangle]$ produces a polynomial in x, where the coefficient of the term $x_{i_1} \ldots x_{i_n}$ is $U \cdot (|1\rangle + |0\rangle)_{i_1} \otimes \ldots \otimes (|1\rangle = |0\rangle)_{i_n} \ominus_{j \neq (i_1, \ldots, i_n)} |0\rangle_j$. These $2^n$ vector coefficients are linearly independent since the columns of U in general are independent, and therefore arbitrary functions can be constructed of the input bits by measuring the result.

Classification Based on Quantum Convolutions

After stacking layers of quantum convolution operators and discarding qubits by either tracing or partial measurements, an output state can be measured and its probability can be estimated by repeated measurements. So in the context of a classification problem, for example, the output of a quantum convolutional network can be interpreted as discrete feature maps that can be further processed with a small conventional classifier, such as shown in FIG. 3.

Figure 3:
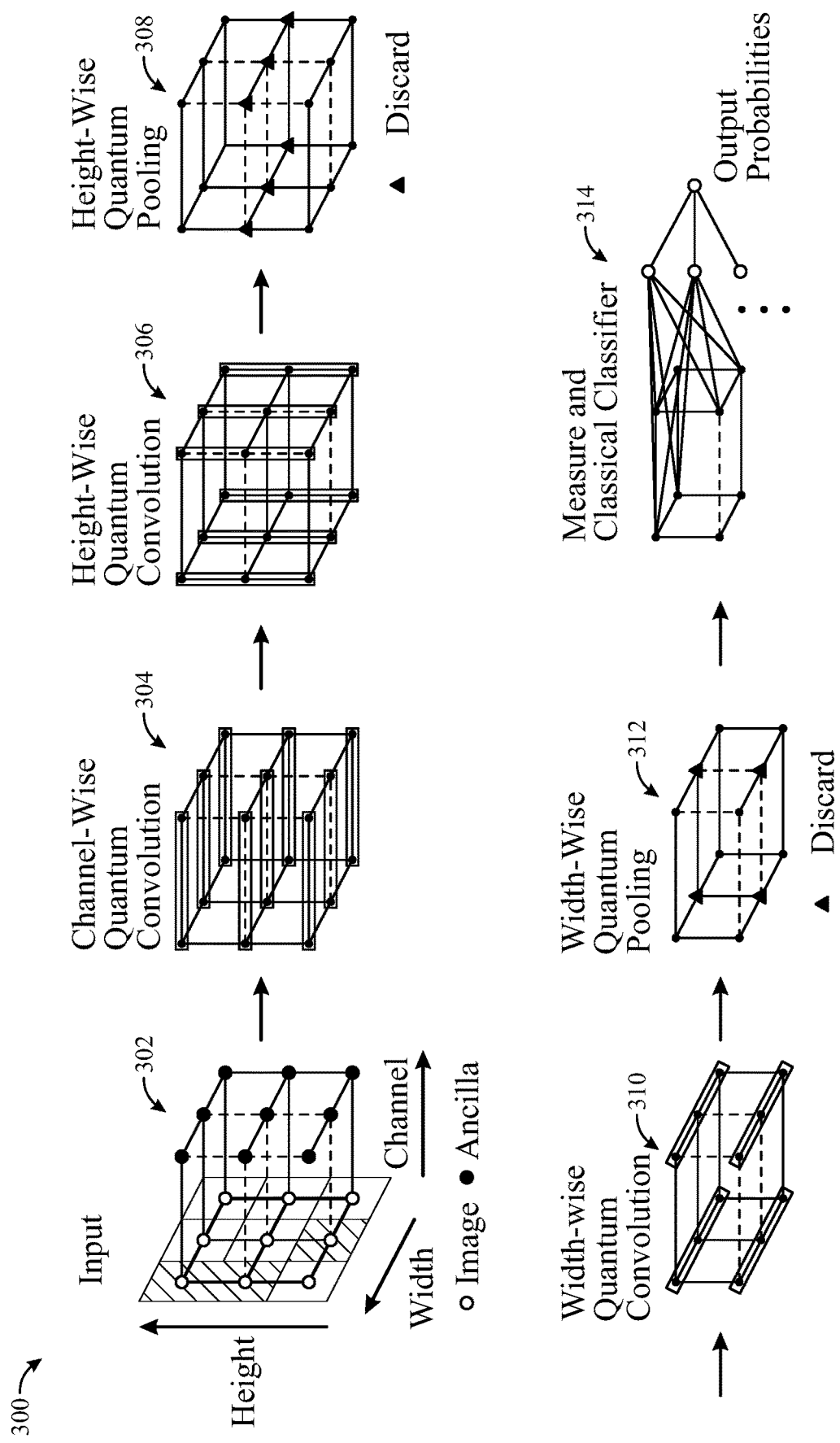
FIG. 3 depicts an example of a quantum neural network architecture.

For example, FIG. 3 depicts a quantum neural network architecture 300 configured to process a 3×3 input image. The depicted architecture employs quantum separable versions of the convolutional layers, which have been employed in conventional neural networks. This allows the computation to be effectively one-dimensional and to be employable as a layer in a classical neural network. In FIG. 3, the rectangles around a segment of the lattice indicate the operation of a 1d quantum convolution.

As depicted in FIG. 3, an input image at 302 has a width and a height as well as a channel dimension (W×H×C). In this example, a first channel represents the image pixels while a second channel is populated with ancilla qubits.

At 304, a channel-wise quantum convolution is performed. For example, the input to a first channel-wise quantum convolution at 304 is a product state ($|\psi\rangle$, as defined above) obtained by concatenating a one-hot representation of an input image with a set of ancilla qubits that have been preprocessed by applying learnable unitary rotations shared across spatial dimensions. The joint state can then be represented as the following matrix product state: $X \in \mathbb{C}^H \otimes \mathbb{C}^W \otimes \mathbb{C}^C \otimes \mathbb{C}^\chi \otimes \mathbb{C}^2 \otimes \mathbb{C}^\chi$ with $\chi=1$, where $\otimes$ represents a tensor (or matrix) product. The state associated with X is obtained by contracting the bond indices along the channel dimension.

Next, the channel-wise layer is applied. Its kernel is a $k_3 \times k_3$ unitary matrix that is applied along the channel dimension (as in FIG. 2) by treating the other dimensions as batch. For concreteness, in this example $k_3=3$ (as in the figure). Note that the action across this dimension can be parallelized for the first time step due to the factorized structure of the matrix product state. The output of this step is tensor describing the block of three spins where U acted: $X' \in \mathbb{C}^H \otimes \mathbb{C}^W \otimes$ $$\mathbb{C}^{\frac{C}{3}}$$

$\otimes \mathbb{C}^\chi \otimes (\mathbb{C}^2)^{\otimes 3} \otimes \mathbb{C}^\chi$.

At this point, two singular value decompositions (SVDs) are applied to each of these block wave functions as in the above equation, which produce a new matrix product state of the above equation with doubled $\chi$. This is true even though the bond dimensions of each term in the decomposition vary because the deficient dimensions can be padded with zeroes to simplify the manipulations without changing the resulting wave function.

Next, a separable convolution may be applied in another dimension, such as height, in step 306. This would normally require a higher dimensional tensor network to be used, such as projected entangled pairs (PEPS) to represent the result of the computation. However, contracting a matrix product state to compute the joint probabilities can be done in O(n) time, whereas the contraction of PEPS is exponentially hard and typically requires iterative schemes to contract the tensor network, which substantially increases the cost of simulating the quantum neural network.

A different approach is to project the entangled state onto a product state, which can be then expressed as a matrix product state with $\chi=1$ and for which the same procedure as discussed above can be used for replacing channels by another dimension in order to simulate the quantum convolution along that dimension. In particular, there are several possible mechanisms for this, including: (1) truncating the matrix product state (MPS) to its largest singular value, which corresponds to the best product state that approximate the entangled state; (2) sample; or (3) prepare a new product state with coefficients given by the marginal probabilities. Note that sampling from the joint distribution and computing the marginal probabilities can be done in O(n) time, even though only sequentially, while the truncation correspond to indexing the MPS and computationally is the most efficient mechanism. An example of a sampling algorithm is described below.

Next, at step 308, a height-wise quantum pooling is performed at step 308 and certain qubits are discarded as indicated.

At 310, a width-wise quantum convolution is performed as described above followed by a width-wise quantum pooling at step 312.

The result of step 312 may be measured by a conventional classifier as depicted at 314, which gives output probabilities for each state, and which allows for selection of the determined output state with the highest probability.

Simulation of Quantum Inspired Neural Networks Using Matrix Product States

Simulating a quantum system is notoriously hard. However, a quantum state and its time evolution may be approximated algorithmically using tensor networks, which may be referred to as matrix product states (MPS) or tensor trains.

For example, a one-dimensional decomposition of a wave function for N qubits $\psi_{s_1,\ldots,s_N}(s_n \in \{1,2\})$ may be expressed as the product of matrices:

$$\psi_{s_1,\ldots,s_N} = \Sigma_{i_k=1}^{\chi_1} X_{i_{N-1}=1}^{\chi_{N-1}} X_{1,s_1,i_1}^1 X_{i_1,s_2,i_2}^2 \ldots X_{i_{N-1},s_N,1}^N \quad (Eq. 1)$$

For fixed N and $s_N$, each tensor $X_{i,s_n,j}$ is a matrix and the number of values taken by the indices $i_k$ is called the bond dimension $\chi_k$. This decomposition can be achieved by repeated usage of a singular value decomposition of a matrix, $M = XSY^\dagger$ as follows:

$$\psi_{s_1,\ldots,s_N} = X_{1,s_1,i_1}^1 S_{i_1} Y_{i_1,s_2,\ldots,s_N} = X_{1,s_1,i_1}^1 X_{i_1,s_2,i_2}^2 S'_{i_2} Y'_{i_2,s_3,\ldots,s_N} = \ldots$$

where the sum over repeated indices is understood. An example of the repeated usage of the singular value decomposition is shown graphically in FIG. 4 for N=6.

In particular, FIG. 4 depicts a graphical representation 402 of a tensor $X_{i,s,j}$ with three indices: i, s, and j, where i is a left index, s is a qubit spin value, and j is a right index in this example. Note that a tensor is generalization of multidimensional data, and a matrix is a tensor with two indices.

FIG. 4 further depicts a matrix product state 404, which is a contracted object depicting the state of n qubits, and which may be generated according to Equation 1, above. In particular, FIG. 4 depicts a graphical representation of matrix product states $\{s_1 \ldots s_6\}$ in which connected edges represent contracted indices i and j. The power of this representation is that many interesting states in physics and in quantum machine learning can be written with a bond dimension (the size of the matrix) that is constant in N. Notably, the singular vector decompositions forming the new MPS are ordered according to the magnitude of the singular values, and the resulting matrices inherit unitarity of the factors (which is known in MPS literature as left and right normalization). This aspect plays an important role in sampling.

Matrix Product State Evolution

A one-hot encoding of a binary tensor corresponding to the input image of size $H \times W \times C_{img}$ can be thought as a product state and represented by a binary tensor $X_{i,s,j}^{h,w,c}$ with $h=1,\ldots,H$, $w=1,\ldots,W$, $c=1,\ldots,C_{img}$, $s=1,2$, and $i=j=1$ only. Note here that $C_{img}$ represents the channels of the image pixels prior to adding any ancilla qubits.

The reason for adding the bond indices i, j is that the time evolution corresponding to the action of a 1d quantum convolution will produce an output tensor with non-trivial bond indices, which corresponds to an entangled state. To make the quantum convolutional architecture more expressive ancilla qubits are added in the following product state:

$$\otimes_{h=1}^H \otimes_{w=1}^W \otimes_{c=1}^{C_{anc}} R_c |0\rangle_{h,w,c},$$

where $R_c$, $c=1, \ldots, C_{anc}$ are learnable 2×2 unitary matrices. This can also be represented as a tensor $X_{i,s,j}^{h,w,c}$ with trivial bond indices that are concatenated to the input image along the channel dimension. X may be denoted by the resulting tensor and by C, the resulting number of channels $C = C_{img} C_{anc}$.

A one dimensional quantum convolution may now be applied to this input along a given direction, say a depth-wise convolution along the width direction. This has a kernel U of size $2^k \times 2^k \times C$ and for concreteness, k=3 as in FIG. 3, where now the horizontal dimension in the figure is the width.

There are three time steps of the quantum convolution. At the first one, U is applied onto blocks of size 3 starting from w=1. This produces a representation for the blocks that call Y:

$$Y_{i,s_1,s_2,s_3,j}^{h,w,c} = \Sigma_{t_1,t_2,t_3} U_{s_1,s_2,s_3,t_1,t_2,t_3}^{h,w,c} \Sigma_{j_1,j_2,j_3} X_{i,t_1,j_1}^{h,w,c} X_{j_1,t_2,j_2}^{h,w+1,c} X_{j_2,t_3,j}^{h,w+2,c} \quad (Eq. 2),$$

where w=1, 4, ..., W/3. At this point, singular value decomposition can be used to decompose Y into a new matrix product state of the output of the first of the quantum convolution:

$$Y_{i,s_1,s_2,s_3,j}^{h,w,c} = \sum_{j_1=1}^{2\chi_1} Z_{i,s_1,j_1}^{h,w,c} S_{j_1}^{h,w,c} Y_{j_1,s_2,j_2}^{h,w,c} = \sum_{j_1=1}^{2\chi_1} \sum_{j_2=1}^{2\min(\chi_1,\chi_2)} Z_{i,s_1,j_1}^{h,w,c} Z_{j_1,s_2,j_2}^{h,w+1,c} Z_{j_2,s_3,j}^{h,w+2,c} \quad (Eq. 3)$$

Now Z can be relabeled as X and these two operations may be repeated for the next two times steps involved in the quantum convolution, starting at w=2 and w=3, respectively. The result is an entangled state $x_{i,s,j}^{h,w,c}$, where $\chi=2^3=8$. Note that left and right bond dimensions might differ. However, for simplicity of exposition here, columns and rows of zeroes are added to the deficient matrices to have equal right and left dimensions at each site.

The matrix product state structure thus allows easy application of quantum pooling operators that project some of the qubits onto a given state, either stochastically by measuring their probabilities or deterministically by projecting onto the vacuum state $|0\rangle$. The result is a new matrix product state with a reduced length and effective matrices obtained by contracting the dangling edges of the projected sites.

For example, given $X_{i,s,j}^{h,w,c}$ and considering the sites w=1, 2, 3 and projecting the spins at w=2, 3 to the $|0\rangle$ state, the following pooled expression is determined:

$$\tilde{X}_{i,s,j}^{h,1,c} = \sum_{j_1,j_2} X_{i,s,j_1}^{h,1,c} X_{j_1,0,j_2}^{h,2,c} X_{j_2,0,j}^{h,3,c}$$

Next, a separable convolution in another dimension may be applied. In some embodiments, this may be performed by projecting the entangled state onto a product state which can be then expressed as a matrix product state with $\chi=1$ and for which the same steps as above may be repeated changing one dimension (e.g., width) for another (e.g., height) in order to simulate the quantum convolution along that dimension. As above, this projection may be performed in various manners, including truncating the matrix product state to its largest singular value, which corresponds to the product state that is closest in Euclidean norm to the original entangled state; sampling (as described below); or preparing a new product state with coefficients given by the marginal probabilities.

FIG. 5 depicts an example algorithm 500 for channel-wise convolution with truncation of the bond dimension, which is the matrix dimension of the matrix product state. In particular, FIG. 5 example demonstrates a 1d quantum convolution with filter size 3 using matrix product states. Algorithm 500 may be used to compute the output of the quantum circuit in FIG. 2.

The outer loop of algorithm 500 includes iteration through the sub-lattices at times 1 to 3, as depicted in FIG. 2.

The inner loop, includes two steps 502 and 504. In step 502, a three-qubit circuit (or gate) (e.g., U in FIG. 2) is applied to a vector of input data (e.g., 202 in FIG. 2) formed by concatenating As.

Then at step 504, singular value decompositions are performed followed by matrix truncation. Step 504 may be performed according to Equations 3 and 4, above.

Note that in algorithm 500, "roll" stands for the operation of shifting the index i once to the right when moving onto a new sub-lattice at the next time step.

Algorithm 500 continues iterating through the inner and outer loops until a final result is produced.

Figure 6:
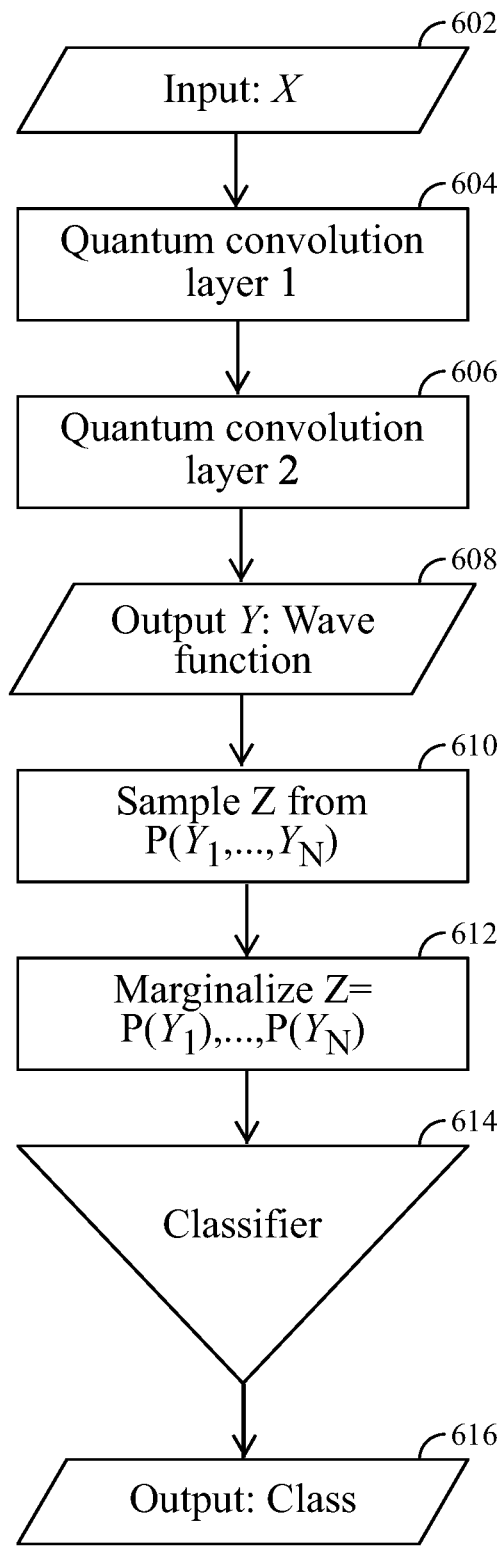
FIG. 6 depicts an example of a quantum convolution process flow.

FIG. 6 depicts an example of a generalized quantum convolution process flow 600.

The flow starts at step 602 with receiving input data, which in this example is a set of bits X The input data X is then convolved through a plurality of quantum convolution layers, which in this example includes two layers at step 604 and 606.

The output of the quantum convolution layer at step 606 is a wave function, Y. The output wave function Y is sampled at step 610 (e.g., sampling Z from $P(Y_1, \ldots, Y_N)$).

Then at step 612, the samples from step 610 are used to generate a marginal probability distribution associated with the possible states of the system (e.g., $P(Y_1)$, $P(Y_N)$).

Then at step 614, the marginal probability distribution is used by a conventional classifier 614 to infer an output class at 616.

Example Matrix Product State Sampling Algorithm

As described herein, a quantum inspired neural network may be configured to project a matrix product state obtained from a 1d quantum convolution to the largest singular values of multiple singular value decompositions. The following presents an algorithm for sampling from a matrix product state. This algorithm may be beneficial because it corresponds to performing a measurement in quantum mechanics, and is therefore a standard quantum operation.

In this example, $X_{i,s,j}^{h,w,c}$ denotes the matrix product state representing the output of a 1d convolution, which may, for example, be the result of a convolution along a width dimension (as in step 310 of FIG. 3). One step of the time evolution (as described in Equations 2 and 3, above) preserves left normalization, namely:

$$\Sigma_{i=1}^{\chi} \Sigma_{s=1}^{2} X_{i,s,j}^{h,w,c} \overline{X_{i,s,j'}^{h,w,c}} = \delta_{jj'},$$

where w=1, W−1 and j, j'=1, ..., χ, which for a product state (χ=1) amounts to the normalization condition. Indeed it may be assumed that X satisfies this condition. Then, the result of one step of time evolution, Z defined in Equation 3 also satisfies this condition. Indeed for the tensors $Z_{i,s,j}^{h,w,c}$ and $Z_{i,s,j}^{h,w+1,c}$ produced by Equation 3, this condition amounts to the normalization of the left singular vectors produced by the singular value decomposition. Thus:

$$\prod_{i=1}^{\chi} \sum_{s_3=1}^{2} Z_{is_3j}^{h,w+2,c} \overline{Z_{is_3j'}^{h,w+2,c}} =$$

$$\sum_{i=1}^{\chi} \sum_{j_1,j_2=1}^{\chi} \sum_{s_2,s_3=1}^{2} Z_{is_1j_1}^{h,w,c} Z_{j_1s_2j_2}^{h,w+1,c} Z_{j_2s_3j}^{h,w+2,c} \overline{Z_{is_1j_1}^{h,w,c} Z_{j_1s_2j_2}^{h,w+1,c} Z_{j_2s_3j'}^{h,w+2,c}} =$$

$$\sum_{i=1}^{\chi} \sum_{j_1,j_2=1}^{\chi} \sum_{s_2,s_3=1}^{2} X_{is_1j_1}^{h,w,c} X_{j_1s_2j_2}^{h,w+1,c} X_{j_2s_3j}^{h,w+2,c} \overline{X_{is_1j_1}^{h,w,c} X_{j_1s_2j_2}^{h,w+1,c} X_{j_2s_3j'}^{h,w+2,c}} = \delta_{jj'}.$$

where the first equality follows from normalization of $Z_{i,s,j}^{h,w,c}$ and $Z_{i,s,j}^{h,w+1,c}$ and the second follows from unitarity of U. This shows that the norm squared of the quantum state represented by the MPS is:

$$\langle \psi | \psi \rangle = \prod_{h=1}^{H} \prod_{c=1}^{C} \prod_{i,j=1}^{\chi} \sum_{s=1}^{2} X_{i,s,j}^{hWc} \overline{X_{i,s,j}^{hWc}} = 1$$

as required by the normalization of the probability distribution defined by the absolute value squared of the wave function. Since this distribution is factorized over h and c, from now on those indices may be omitted and the correlations over the width direction may be the focus. The aim is to sample from:

$$p(s_1, \ldots, s_W) = X_{j_1s_1j_2}^{1} \overline{X_{i_1s_1i_2}^{1}} X_{j_2s_2j_3}^{2} \overline{X_{i_2s_2i_3}^{2}} \cdots X_{j_{W-1}s_Wj_W}^{W} \overline{X_{i_{W+1}s_Wj_W}^{W}}$$

Sampling may be performed sequentially using the chain rule of probabilities:

$$p(s_1, \ldots, s_W) = p(s_W) p(s_{W-1} | s_W) p(s_{W-2} | s_{W-1}, s_W) \cdots p(s_1 | s_2, \ldots, s_W)$$

Using the left normalization equation above, the sampling can be performed in O(W) time. Indeed, the marginal $p(s_W)$ can be computed in O(1) time as:

$$p(s_{W-1} | \hat{s}_W) = \Sigma_{i,s_{W-1}j_1}^{W-1} \overline{X_{i,s_{W-1}j_2}^{W-1}} X_{j_1,\hat{s}_Wj}^{W} \overline{X_{j_2,\hat{s}_Wj}^{W}},$$

from which $\hat{s}_{W-1}$ can be sampled. Proceeding this way, sampling from the joint probability distribution can be performed sequentially.

Example Method for Performing Quantum Convolution

Figure 7:
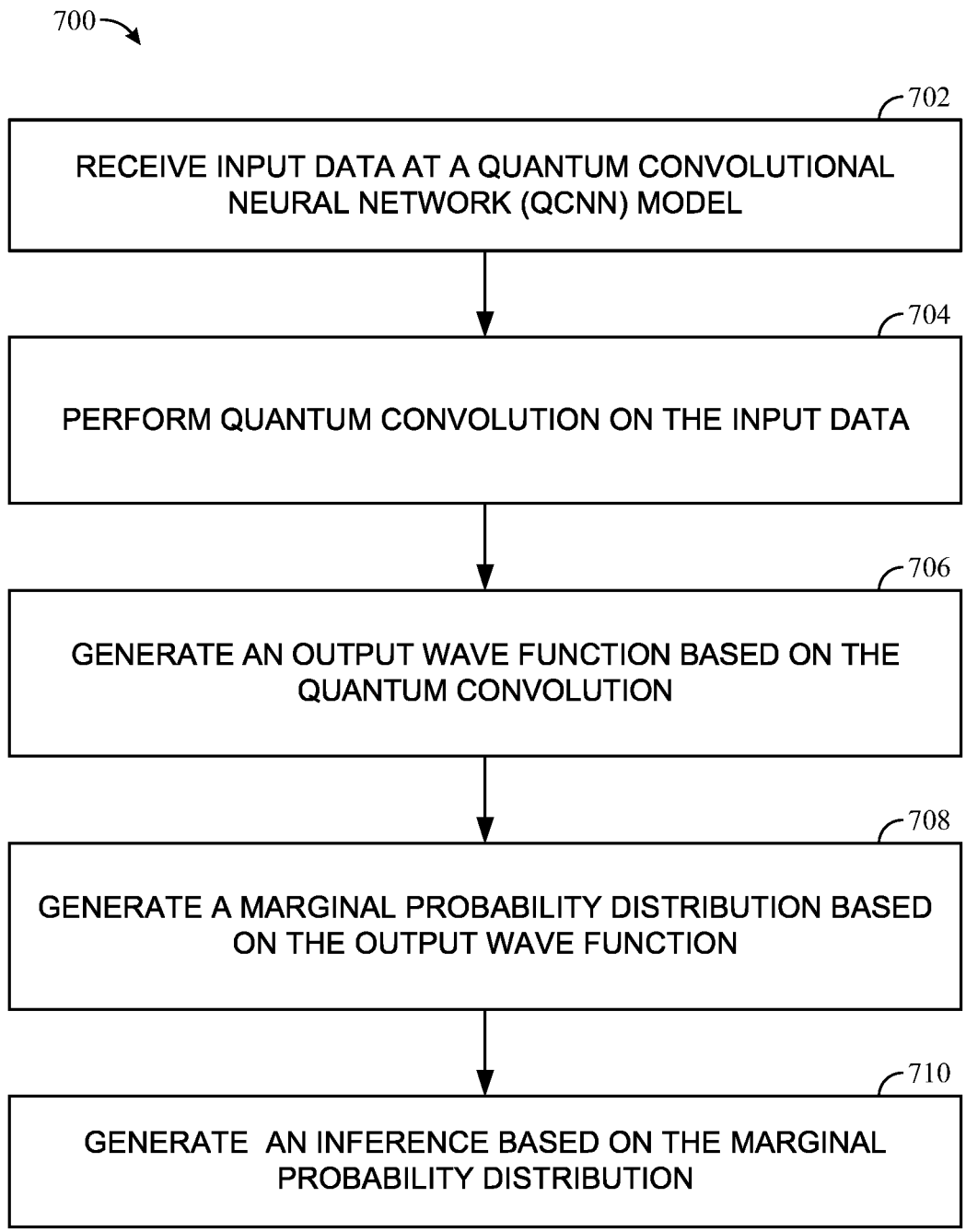
FIG. 7 depicts an example method for performing quantum convolution.

FIG. 7 depicts an example method 700 for performing quantum convolution.

Method 700 begins at step 702 with receiving input data at a quantum convolutional neural network model, which is generally a neural network model comprising at least one quantum convolutional layer.

Method 700 then proceeds to step 704 with performing quantum convolution on the input data using one or more quantum convolutional layers in the quantum convolutional neural network model. In some embodiments, performing the quantum convolution includes generating matrix product states, as discussed above.

Method 700 then proceeds to step 706 with generating an output wave function based on the quantum convolution of the input data.

Method 700 then proceeds to step 708 with generating a marginal probability distribution based on the output wave function. In some embodiments, the marginal probability distribution is generated via sampling the output wave function, as described above.

Method 700 then proceeds to step 710 with generating an inference based on the marginal probability distribution. As described above, in some embodiments, the inference may be generated using a conventional classifier that takes as an input a plurality of state probabilities generated by the marginal probability distribution. The inference may be a predicted state of a system based on the input data.

In some embodiments of method 700, performing quantum convolution on the input data using the at least one quantum convolutional layer further comprises: performing a plurality of singular value decompositions on the output wave function; and approximating one or more quantum states using a matrix product state based on the plurality of singular value decompositions.

In some embodiments, method 700 further includes performing quantum pooling on output from the at least one quantum convolutional layer.

In some embodiments of method 700, generating the marginal probability distribution based on the output wave function further comprises: generating a plurality of samples based on the output wave function; and generating the marginal probability distribution based on the plurality of samples.

In some embodiments of method 700, generating an inference based on the marginal probability distribution further comprises: generating a plurality of state probabilities based on the marginal probability distribution; and using a classifier to generate the inference based on the plurality of state probabilities.

In some embodiments of method 700, the inference comprises a predicted state of a plurality of states associated with the plurality of state probabilities.

In some embodiments of method 700, the input data comprises a one-hot vector format.

In some embodiments of method 700, the input data comprises one of: image data or audio data.

Example Processing Systems for Performing Quantum Convolutions

Figure 8:
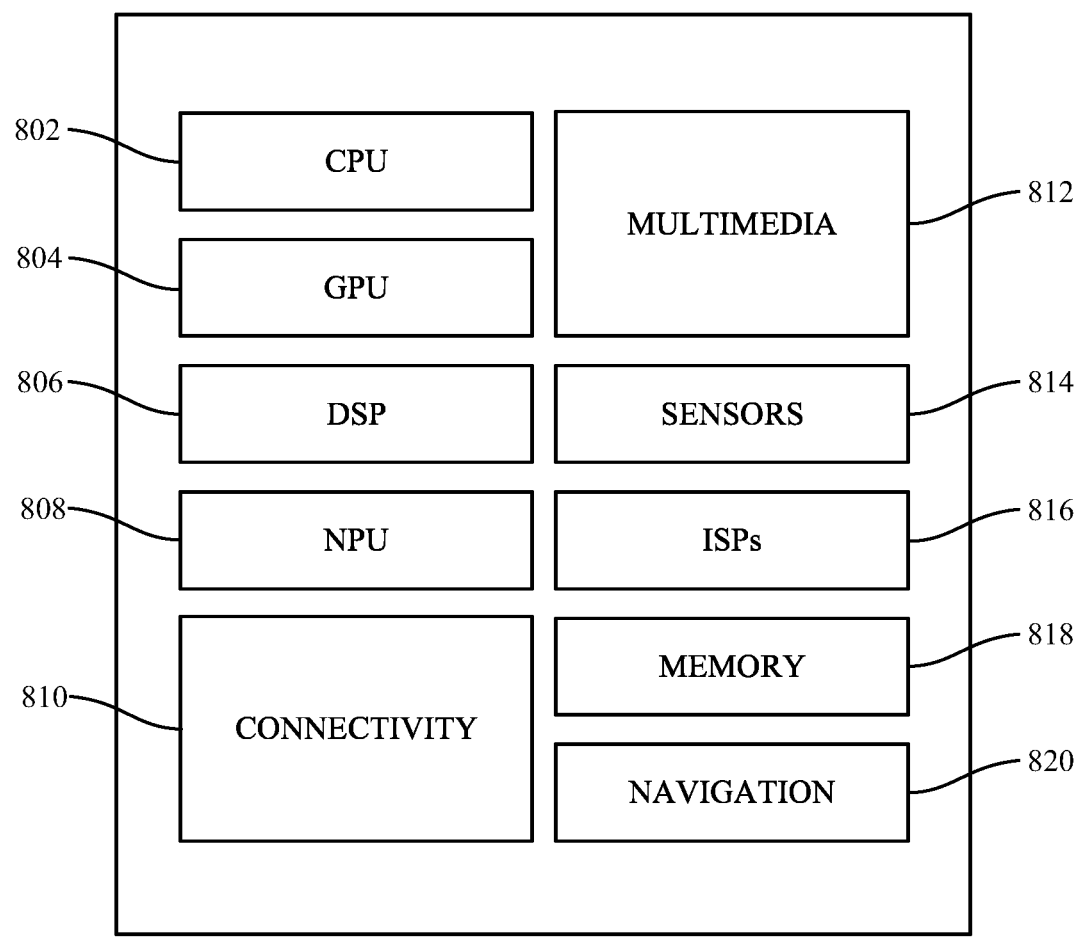
FIG. 8 depicts an example implementation of processing system.

FIG. 8 depicts an example implementation of a processing system 800.

In the depicted embodiment, processing system 800 includes a plurality of processing units, configured to perform quantum convolutions, in accordance with certain aspects of the present disclosure. The various processing units include a central processing unit (CPU) 802, which may be a multi-core CPU, a graphics processing unit (GPU) 804, a digital signal processor (DSP) 806, and a neural processing unit (NPU) 808.

Model data, including parameters or variables, such as neural network weights, may be stored in various memory block associated any of the processing units of processing system 800, including, for example, the NPU 808, the CPU 802, the GPU 804, and the DSP 806, as well as in a system memory block 818. In some embodiments, the model data may be distributed across multiple memory locations.

Instructions executed at by any of the processing units of processing system 800 may be loaded from the various aforementioned memory blocks, including system memory block 818.

Processing system 800 may also include additional processing blocks tailored to specific functions, such as connectivity block 810, which may include fifth generation (5G) connectivity, fourth generation long term evolution (4G LTE) connectivity, Wi-Fi connectivity, USB connectivity, Bluetooth connectivity, and the like, and a multimedia processor 812 that may, for example, detect and recognize gestures.

Processing system 800 may also include one or more sensor processors 814 associated with any manner of sensor, one or more image signal processors (ISPs) 816, and/or a navigation module 820, which may include a global positioning system.

In some embodiments, processing system 800 may be based on an ARM instruction set.

Processing system 800 and/or components thereof may be configured to perform the methods described herein. Notably, processing system 800 is one example, and in other examples, fewer aspects may be included. For example, a server computer configured to perform the various methods described herein may omit various features, such as connectivity 810, multimedia 812, sensors 814, and navigation 820. In some embodiments, various processing units and functions may be distributed across more than one processing system.

Figure 9:
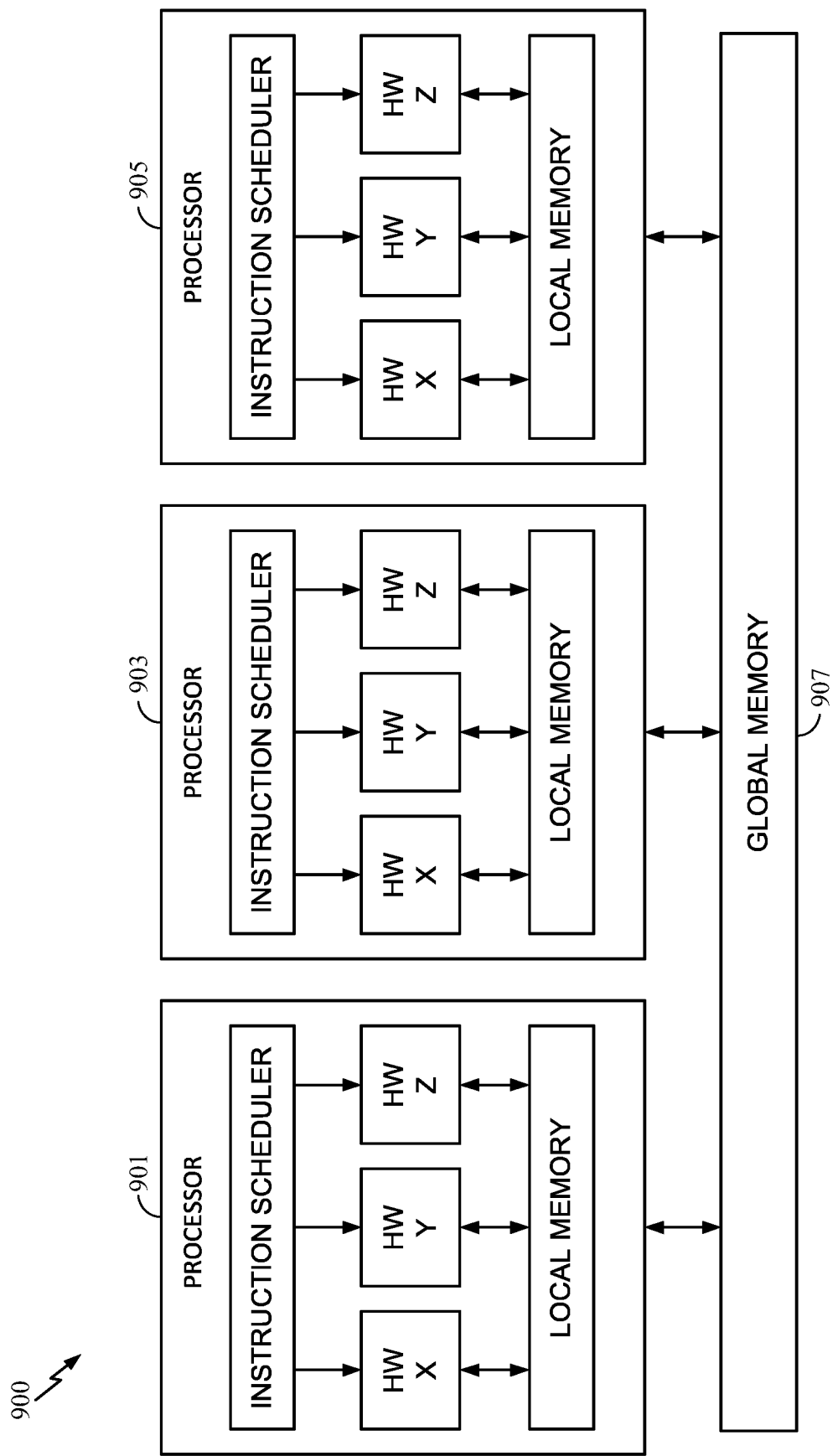
FIG. 9 depicts an example schematic diagram of a multi-processor processing system.

FIG. 9 depicts an example schematic diagram of a multi-processor processing system 900 that may be implemented with embodiments described herein.

In this example, system 900 includes processors 901, 903, and 905, but in other examples, any number of individual processors may be used. Further, though depicted similarly, processors 901, 903, and 905 may be representative of various different kinds of processors in an electronic device, such as CPUs, GPUs, DSPs, NPUs, and the like as described herein.

Each of processors 901, 903, and 905 includes an instruction scheduler, various hardware sub-components (e.g., hardware X, hardware Y, and hardware Z), and a local memory. The local memory may be a tightly coupled memory (TCM) in some embodiments. Note that the components of each of processors 901, 903, and 905 is shown as the same in this example, each of the processors may have different hardware configurations, different hardware elements, etc.

Each of processors 901, 903, and 905 is also in data communication with a global memory, such as a DRAM memory, or other types of volatile working memory.

In some implementations, in a multi-processor processing system such as 900, one of the processors may act as a master processor. For example, processor 901 may be a master processor in this example. A master processor may include a compiler that, when executed, can determine how a model, such as a neural network model, will be processed by various components of processing system 900. For example, hardware parallelism may be implemented by mapping portions of the processing of a model to various hardware (e.g., hardware X, hardware Y, and hardware Z) within a given processor (e.g., processor 901) as well as mapping portions of the processing of the model to other processors (e.g., processors 903 and 905) and their associated hardware.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing quantum convolution, comprising:
    receiving input data to be processed by a neural network model, wherein the neural network model comprises at least one quantum convolutional layer;
    performing a quantum convolution on the input data using the at least one quantum convolutional layer;
    generating an output wave function based on the quantum convolution using the at least one quantum convolution layer;
    generating a marginal probability distribution based on the output wave function; and
    generating an inference based on the marginal probability distribution.

2. The method of claim 1, wherein performing the quantum convolution on the input data using the at least one quantum convolutional layer further comprises:
    performing a plurality of singular value decompositions on the output wave function; and
    approximating one or more quantum states using a matrix product state based on the plurality of singular value decompositions.

3. The method of claim 1, further comprising: performing quantum pooling on output from the at least one quantum convolutional layer.

4. The method of claim 1, wherein generating the marginal probability distribution based on the output wave function further comprises:
    generating a plurality of samples based on the output wave function; and
    generating the marginal probability distribution based on the plurality of samples.

5. The method of claim 1, wherein generating the inference based on the marginal probability distribution further comprises:
    generating a plurality of state probabilities based on the marginal probability distribution; and
    using a classifier to generate the inference based on the plurality of state probabilities.

6. The method of claim 5, wherein the inference comprises a predicted state of a plurality of states associated with the plurality of state probabilities.

7. The method of claim 1, wherein the input data comprises a one-hot vector format.

8. A processing system, comprising:
    a memory comprising computer-executable instructions;
    one or more processors configured to execute the computer-executable instructions and cause the processing system to:
        receive input data to be processed by a neural network model, wherein the neural network model comprises at least one quantum convolutional layer;
        perform a quantum convolution on the input data using the at least one quantum convolutional layer;
        generate an output wave function based on the quantum convolution using the at least one quantum convolution layer;
        generate a marginal probability distribution based on the output wave function; and
        generate an inference based on the marginal probability distribution.

9. The processing system of claim 8, wherein in order to perform the quantum convolution on the input data using the at least one quantum convolutional layer, the one or more processors are further configured to cause the processing system to:
perform a plurality of singular value decompositions on the output wave function; and
approximate one or more quantum states using a matrix product state based on the plurality of singular value decompositions.

10. The processing system of claim 8, wherein the one or more processors are further configured to cause the processing system to: perform quantum pooling on output from the at least one quantum convolutional layer.

11. The processing system of claim 8, wherein in order to generate the marginal probability distribution based on the output wave function, the one or more processors are further configured to cause the processing system to:
generate a plurality of samples based on the output wave function; and
generate the marginal probability distribution based on the plurality of samples.

12. The processing system of claim 8, wherein in order to generate the inference based on the marginal probability distribution, the one or more processors are further configured to cause the processing system to:
generate a plurality of state probabilities based on the marginal probability distribution; and
use a classifier to generate the inference based on the plurality of state probabilities.

13. The processing system of claim 12, wherein the inference comprises a predicted state of a plurality of states associated with the plurality of state probabilities.

14. The processing system of claim 8, wherein the input data comprises a one-hot vector format.

15. A non-transitory computer-readable medium comprising computer-executable instructions that, when executed by one or more processors of a processing system, cause the processing system to perform a method for performing quantum convolution, the method comprising:
receiving input data at a neural network model, wherein the neural network model comprises at least one quantum convolutional layer;
performing a quantum convolution on the input data using the at least one quantum convolutional layer;
generating an output wave function based on the quantum convolution using the at least one quantum convolution layer;
generating a marginal probability distribution based on the output wave function; and
generating an inference based on the marginal probability distribution.

16. The non-transitory computer-readable medium of claim 15, wherein performing the quantum convolution on the input data using the at least one quantum convolutional layer further comprises:
performing a plurality of singular value decompositions on the output wave function; and
approximating one or more quantum states using a matrix product state based on the plurality of singular value decompositions.

17. The non-transitory computer-readable medium of claim 15, wherein the method further comprises: performing quantum pooling on output from the at least one quantum convolutional layer.

18. The non-transitory computer-readable medium of claim 15, wherein generating the marginal probability distribution based on the output wave function further comprises:
generating a plurality of samples based on the output wave function; and
generating the marginal probability distribution based on the plurality of samples.

19. The non-transitory computer-readable medium of claim 15, wherein generating the inference based on the marginal probability distribution further comprises:
generating a plurality of state probabilities based on the marginal probability distribution; and
using a classifier to generate the inference based on the plurality of state probabilities.

20. The non-transitory computer-readable medium of claim 19, wherein the inference comprises a predicted state of a plurality of states associated with the plurality of state probabilities.

21. The non-transitory computer-readable medium of claim 15, wherein the input data comprises a one-hot vector format.

* * * * *